April 30, 1935.   R. N. KIRCHER   1,999,658
CORN POPPER
Filed Oct. 27, 1932
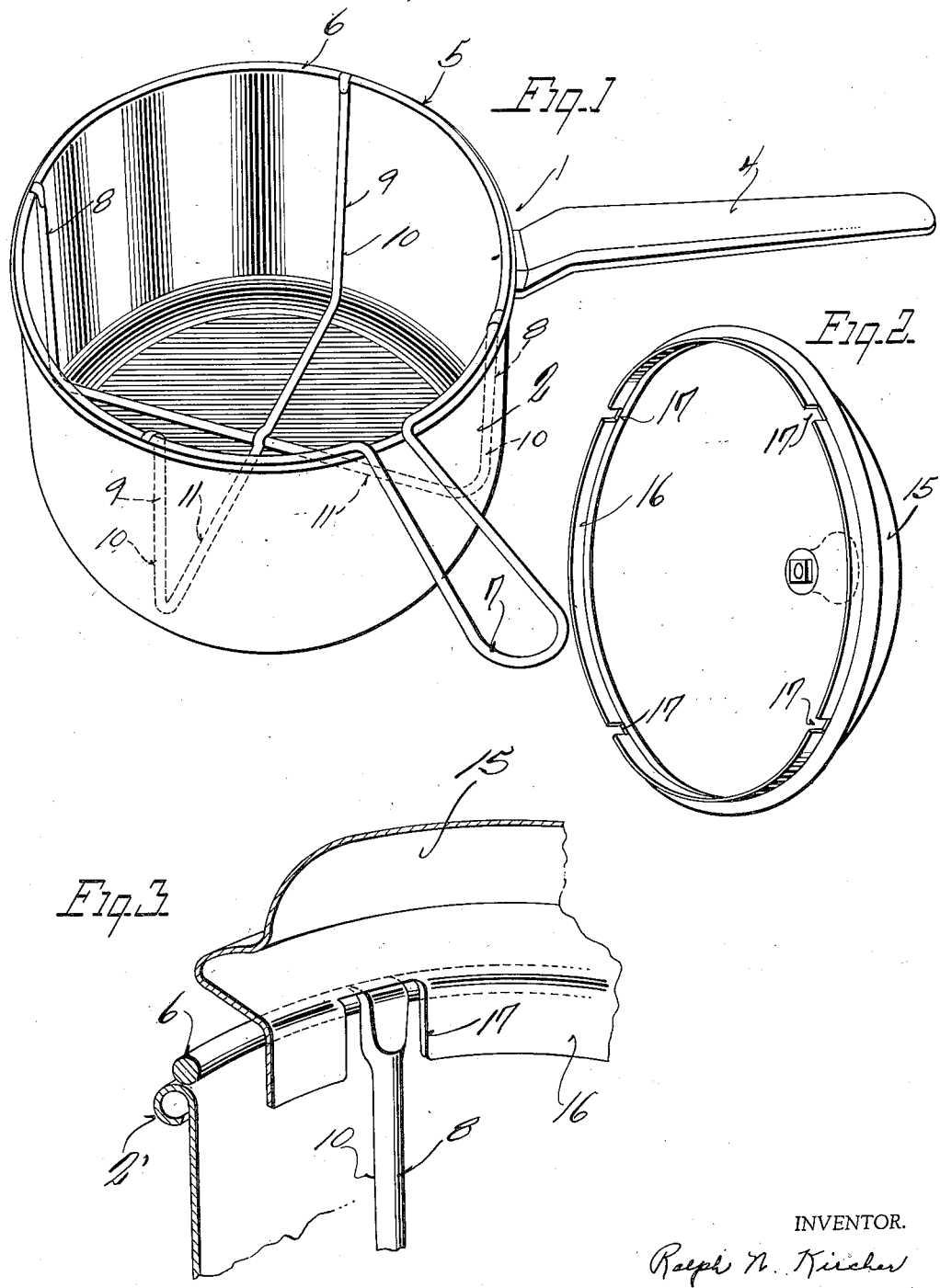
INVENTOR.
Ralph N. Kircher
BY
ATTORNEYS Patented Apr. 30, 1935

1,999,658

UNITED STATES PATENT OFFICE 1,999,658

CORN POPPER

Ralph N. Kircher, West Bend, Wis., assignor to West Bend Aluminum Co., West Bend, Wis., a corporation of Wisconsin Application October 27, 1932, Serial No. 639,759

8 Claims. (Cl. 53—4)

This invention relates to an improvement in corn poppers and among its objects are to provide a corn popper so simply and compactly constructed and so closely organized as to be convenient, safe and comfortable to handle and operate as well as easy and comparatively inexpensive to manufacture.

In carrying out the present invention, the agitator element is so combined with the vessel or receptacle in which the popcorn grains are popped and has its handle so related thereto and to the handle of the vessel that the two handles may be conveniently grasped and manipulated to effect an easy and efficient agitation thereby precluding burning of the popcorn grains and insuring uniform admixture therewith of the butter and seasoning usually employed. These advantages are realized while avoiding the necessity of placing either hand in the region of the heat or flame employed to heat the vessel and the contents thereof.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a perspective view showing a corn popper embodying the present invention, the covering being removed;

Figure 2 is a perspective view of the cover; and

Figure 3 is a fragmentary view partly in perspective and partly in vertical section illustrating how the flange of the cover is interfitted with the vessel and with the agitating means.

Referring to the drawing, the numeral 1 designates generally the receptacle or vessel in which the corn is popped, the receptacle having the form of a conventional pan in that it is made up of a cylindrical body portion 2 having an integral bottom 3. An outwardly extending handle 4 is provided on the receptacle.

The present invention proposes an agitator designated generally at 5 and in the construction illustrated the agitator 5 comprises a ring-like supporting member designated generally at 6 and which may have integral therewith an outwardly extending handle 7. U-shaped agitator elements 8 and 9 are provided and are carried by the supporting ring 6. The agitator elements 8 and 9 are of similar construction in that each has a pair of legs designated at 10 and a body portion 11 connecting such legs. The upper ends of the legs of each agitator element are suitably fastened or connected to the supporting ring. For example, they may be soldered, brazed or welded thereto. The upper ends of the legs of each agitator element may be flattened out to better adapt them for their connection with the ring. As shown in the drawings, the agitator elements 8 and 9 are disposed at right angles to each other and have their body portions crossing and disposed against the bottom of the receptacle. It may be desirable, although it is not necessary, to have a slight clearance between the body portions of the agitating elements 8 and 9 and the bottom of the pan-like vessel and in such event the agitator is supported by its ring 6 which rides on the rim 2' of the vessel as clearly illustrated in Figure 3.

When the agitator and the vessel are assembled, the handle 7 of the agitator is disposed in approximate parallelism to the handle 4 of the vessel so that the person cooking the popcorn may grasp the handle 4 with one hand and the handle 7 with the other and by easy motion bring these handles toward and away from each other, thereby producing the required agitating motion in the agitator and yet maintaining control over the device.

When the device is in use, the bottom of the pan-like vessel is placed over the flame, hot plate or other heating means and since the handles 4 and 7 extend outwardly beyond the pan it is not necessary for the person using the same to bring either hand into the region of the heat in manipulating the popper.

The corn popper is completed by a cover designated generally at 15, the cover being of conventional construction except for the fact that its downwardly extending flange 16 has a plurality of notches 17. There is one such notch for each leg 10 of the agitating elements. By providing the notches it is convenient to have the flange of the cover fit in the upper open end of the vessel with sufficient snugness to prevent the contents of the vessel from being expelled therefrom. It is to be understood, of course, that the notches accommodate the upper ends of the upper legs of the agitating elements.

In use, the agitator is placed in the pan-like vessel in the manner shown in Figure 1. The popcorn, together with butter and seasoning, is then placed in the vessel. Thereupon the cover 15 is applied and the vessel is placed over the heating means employed. While the contents of the vessel are heating up the operator grasps the handles 4 and 7 and moves them back and forth, that is, toward and away from each other, to prevent the popcorn grains from burning and to uniformly distribute the seasoning and butter therethrough. The arrangement of the handles, the manner in which they are combined with and related to the vessel and the agitator and the manner in which the agitator is combined with the vessel all contribute to the provision of an easily and conveniently handled device and one which is, in general, comfortable and safe to operate. Furthermore, the structure has the advantages of simplicity and of ease and economy from a manufacturing point of view.

While I have shown and described one construction in which the invention may be embodied, it is to be understood that this construction has been selected for the purposes of illustration and that various changes may be made in the size, shape and arrangement of the parts without departing from the spirit of the invention or the scope of the subjoined claims.

The invention claimed is:

1. A corn popper comprising a vessel having an outwardly projecting handle, a U-shaped agitator within said vessel including a body portion extending across the bottom thereof and legs extending up the sides thereof, an outwardly projecting handle connected to said U-shaped agitator, and a cover for said vessel having a flange fitting in the upper end thereof and provided with notches for receiving the upper ends of the legs of the agitator.

2. A corn popper comprising, in combination with a vessel and a removable cover therefor, an agitator within said vessel, supporting means having portions mounted on the rim of the vessel for sliding movement circumferentially thereof and interposed between the rim and said cover, said portions and said agitator being rigidly secured together whereby said agitator is supported by said supporting means and constrained to move therewith, and a handle fixed to said supporting means and extending beyond the confines of said vessel from under its cover to provide for convenient actuating of said agitator.

3. A corn popper comprising, in combination with a vessel having an open upper end, a rim therearound, an outwardly extending handle secured thereto and a removable cover for the open end thereof, an agitator within said vessel, supporting means separate from the cover and having portions mounted on said rim for sliding movement and interposed between the rim and said cover, said agitator being connected to said portions to be supported thereby and rotated therewith, and an actuating handle fixed to said supporting means and extending beyond the vessel from under its cover whereby said first mentioned handle may be grasped to control the position of said vessel and said actuating handle may be grasped to oscillate said supporting means and said agitator relative to the vessel.

4. A corn popper comprising, in combination with a vessel and a removable cover therefor, a supporting member separate from the cover and mounted on the rim of the vessel below the cover for sliding movement circumferentially of said rim, an agitator carried by said supporting member and depending within the vessel and a handle fixed to said supporting member and extending therefrom to facilitate actuation of said supporting member and said agitator exteriorly of the vessel and its cover.

5. A corn popper comprising, in combination with a vessel having an open upper end, a rim therearound and a removable cover therefor, an agitator within the vessel, supporting means separate from the cover and interposed between the rim and the cover and having opposed portions extending circumferentially of and mounted on said rim for sliding movement circumferentially relative thereto, said opposed portions being fixed to and thereby supporting said agitator for movement within the vessel and a handle fixedly secured to one of said portions of said supporting means and extending therefrom whereby the handle may be conveniently utilized to effect relative movement of the agitator and vessel.

6. A corn popper comprising, in combination with a vessel having an open upper end, a rim therearound and a removable cover therefor, an agitator within said vessel, a supporting ring constructed of wire stock, interposed between the rim and the cover and mounted on the rim for sliding movement, said supporting ring being secured to the agitator and supporting the same for movement within the vessel and a handle integral with the ring and extending outwardly therefrom and with respect to the vessel and its cover.

7. In a corn popper including a vessel having an open upper end, a rim therearound and a remable cover therefor, a split supporting ring of wire stock mounted on said rim for sliding movement circumferentially thereof and interposed between the rim and the cover, there being a handle integral with said ring at the split thereof, said handle extending outwardly beyond the confines of the cover and vessel whereby it may be grasped exteriorly of said cover and vessel and utilized to rotate said ring to and fro on said rim, and a generally U-shaped agitating element also constructed of wire stock and disposed within the vessel with its body portion adjacent the bottom thereof and the upper ends of its legs secured to said ring whereby the agitating element is supported from the ring and constrained to move therewith.

8. A corn popper comprising a vessel having a removable cover, a ring-like supporting member slidably carried by the rim of said vessel and having a handle fixedly secured thereto, and an agitator secured to said ring-like supporting member and depending within the vessel, said removable cover provided with a flange removably fittable within said ring-like supporting member and in slidably close contact with the inner walls of said vessel when the cover is in the closed position whereby said cover may be used with the vessel with the agitator removed.

RALPH N. KIRCHER.